Oct. 27, 1931.  E. HIBBERT  1,829,483
PNEUMATIC TIRE
Filed Oct. 24, 1929
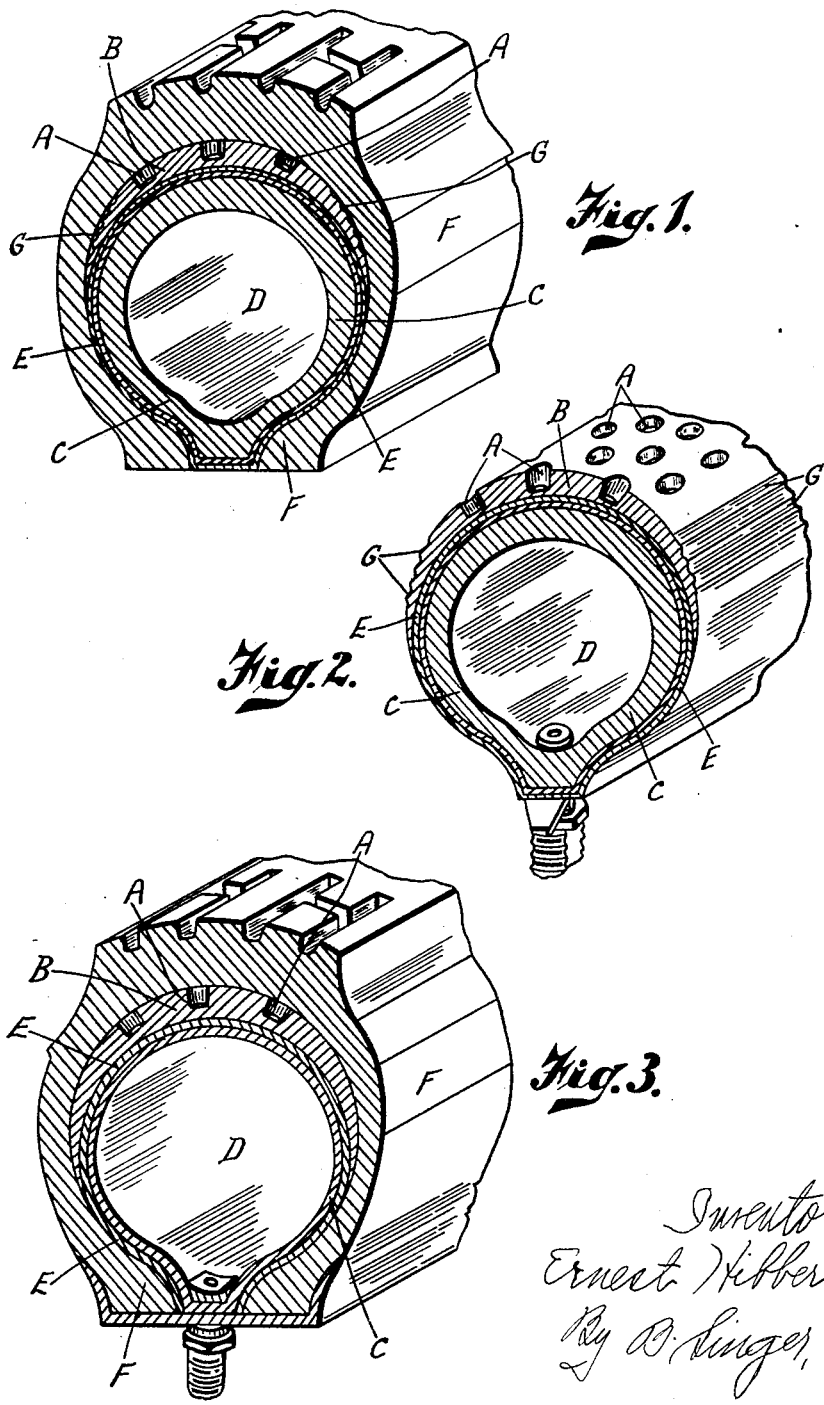

Patented Oct. 27, 1931

1,829,483

UNITED STATES PATENT OFFICE

ERNEST HIBBERT, OF GOULBURN, NEW SOUTH WALES, AUSTRALIA, ASSIGNOR TO THE PIONEER CELL TYRE COMPANY LIMITED, OF SYDNEY, NEW SOUTH WALES, AUSTRALIA, A CORPORATION OF NEW SOUTH WALES

PNEUMATIC TIRE

Application filed October 24, 1929, Serial No. 402,277, and in Australia November 1, 1928.

This invention relates to a process for the manufacture of tubes for resilient pneumatic tires for the wheels of motor vehicles and the like and has for its principal object to provide a durable and efficient inner tube which will practically eliminate punctures and blowouts. This invention comprises a series of steps in the process of manufacture of an inner tube and provides for the formation of air cells in the tread portion of the tube, the cells being adapted in conjunction with a tire cover to retain air at atmospheric pressure.

In order that the invention may be more clearly understood, reference will now be made to the accompanying drawings in which:—

Figure 1 is a sectional view showing one form of tube made according to the invention the tube being disposed in a tire cover of ordinary construction.

Figure 2 is a sectional perspective view showing a portion of an improved tube made according to the present process.

Figure 3 illustrates an application of a modification of the process wherein a saddle shaped tube portion is constructed according to the present invention and is disposed round a separate pneumatic tube.

The invention will now be described by the aid of the drawings. The tube C is formed in lengths from laminated soft air holding tube rubber upon a suitable mandrel having a diameter less than the internal diameter of the tube when finished.

When the requisite number of laminations of air holding rubber have been built upon the core the latter is removed from the tube. The tube is then joined and inflated with air at a suitable pressure in order firstly, to enlarge the internal cavity of the tube until its internal cross sectional area is equal to the internal cross section area of the tire cover in which the finished tube is to be placed, and secondly to keep the so-far-built up tube (C) in shape.

The tube C is then further built up by being coated with junction rubber in solution or in sheet form. After the junction rubber has been applied to the tube the latter is bound with laminations E of sheet rubber, which is preferably of a kind known as carbon black mixed stock. A strip of tough tread rubber (B) is then placed around the tread portion of the tube, the width and thickness of the strip being such that a desired number of cells of full depth may be formed therein without penetrating or even abutting the last layer of tube rubber.

It has been found that the tough strip of tread rubber (B) should measure in width approximately two thirds of the sectional diameter of the finished tube. To prevent friction between the finished tube and the cover in which it is to be placed the former may have grooves (G) formed therein. The finished tube, when placed in a tire will be thickest at the tread position; and will be of approximately equal thickness at the sides and the base as shown in the drawings.

The built up tube is now placed in a vulcanizing mould provided with means for forming the cells and having an internal cross sectional area equal to that of the cover in which the tube is to be used. At this stage of manufacture the two halves or sections of the mould are closed. The tube is inflated to a pressure sufficient to expand the internal air holding portion or cavity D of the tube to the desired sectional area and at the same time force the tread rubber B of the tube against the mould at sufficient pressure to form the air cells (A) in the finished product in well known manner.

The tube before being vulcanized may be further re-inforced by being bound with rubber treated fabric or other suitable material.

If it is desired that the tube C should not be integral with the other portion of the tube, the latter is made saddle shaped and has tapered flaps at its base between which the tube C containing the air cavity D is inserted as shown in Figure 3.

The outer surface of the cells (A) may be closed by vulcanizing a layer of rubberized fabric or other suitable material over their outer surface. In this latter case the cells (A) may be separately inflated by a hollow needle which is passed through a small unvulcanizable rubber wad in the wall of the cell in well known manner.

If desired the cell portion of the tube may have incorporated therewith rubberized fabric and the finished product may have beads of well known form for securing it to a rim and thereby forming a combination cell tube capable of being used without a tire.

I claim:

1. The process for making a tube for pneumatic tires, consisting in forming a laminated tube of sheet soft air holding rubber upon removable core, expanding said tube by air at a suitable pressure to the full internal diameter of the cover intended to be used therewith, applying to the expanded tube a coating of junction rubber, applying a binding of sheet rubber to the so formed tube, placing strips of tough tread rubber on the binding adjacent to the position to be occupied by the tread of the tire, moulding air cells in the tread rubber and vulcanizing the built up product while under internal pressure.

2. The process for making a tube for pneumatic tires, consisting in forming a laminated tube of sheet soft air holding rubber upon a removable core, expanding said tube by air at a suitable pressure to the full internal diameter of the cover intended to be used therewith, applying to the expanded tube a coating of junction rubber, applying a binding of sheet rubber to the so formed tube, placing strips of abrasion resisting material on the binding adjacent to the position occupied by the tread of the tire, disposing strips of tough tread rubber upon the abrasion resisting material, moulding air cells in the tread rubber and vulcanizing the built up product while under internal pressure.

3. The process for making a tube for pneumatic tires, consisting in forming a laminated tube of sheet soft air holding rubber upon a removable core, expanding said tube by air at a suitable pressure to the full internal diameter of the cover intended to be used therewith, applying to the expanded tube a coating of junction rubber, applying a binding of sheet rubber to the so-formed tube, placing strips of tough tread rubber on the binding adjacent to the position to be occupied by the tread of the tire, moulding air cells and grooved shoulders in the tread rubber and vulcanizing the built up product while under internal pressure.

In testimony whereof I have hereunto set my hand.

ERNEST HIBBERT.